(12) United States Patent
Fielding et al.

(10) Patent No.: US 9,835,278 B2
(45) Date of Patent: Dec. 5, 2017

(54) DUCT COUPLING APPARATUS AND METHOD OF ITS USE

(71) Applicant: Chase Supply, Inc., Hampton, VA (US)

(72) Inventors: Fred Fielding, Owings, MD (US); Luke Morin, Fredricksburg, TX (US)

(73) Assignee: Chase Supply, Inc., Hampton, VA (US)

(*) Notice: Subject to any disclaimer, the term of this patent is extended or adjusted under 35 U.S.C. 154(b) by 1126 days.

(21) Appl. No.: 13/958,860

(22) Filed: Aug. 5, 2013

(65) Prior Publication Data
US 2015/0034201 A1 Feb. 5, 2015

(51) Int. Cl.
| F16L 37/12 | (2006.01) |
| F24F 13/02 | (2006.01) |
| F16L 23/036 | (2006.01) |
| F16L 33/08 | (2006.01) |
| B64F 1/36 | (2017.01) |

(52) U.S. Cl.
CPC ......... F16L 37/1205 (2013.01); F16L 23/036 (2013.01); F16L 33/08 (2013.01); *B64F 1/362* (2013.01); *F24F 13/02* (2013.01); *Y10T 29/49435* (2015.01); *Y10T 403/648* (2015.01)

(58) Field of Classification Search
CPC ..... F16L 37/1205; F16L 33/08; F16L 37/121; F16L 37/1215; F16L 37/127; F16L 37/18; B64F 1/362; F24F 13/0209; F24F 13/0218; Y10T 403/591; Y10T 403/64; Y10T 403/648

USPC ............... 285/363, 364; 403/322.1, 335, 338
See application file for complete search history.

(56) References Cited

U.S. PATENT DOCUMENTS

| 1,233,168 | A | * | 7/1917 | Berry | F16L 37/252 |
| | | | | | 285/363 |
| 2,951,717 | A | * | 9/1960 | Zaber | E02F 7/10 |
| | | | | | 285/311 |
| 3,185,503 | A | * | 5/1965 | Angle | F16L 37/24 |
| | | | | | 285/363 |
| 3,618,988 | A | * | 11/1971 | Zurmuehlen | F16L 37/20 |
| | | | | | 285/312 |
| 2011/0194894 | A1 | * | 8/2011 | Seraphinoff | F16L 23/14 |
| | | | | | 403/338 |

FOREIGN PATENT DOCUMENTS

JP 02026396 A * 1/1990 ............. F16L 23/02

* cited by examiner

*Primary Examiner* — Josh Skroupa
(74) *Attorney, Agent, or Firm* — Wiley Rein LLP

(57) ABSTRACT

A duct coupling apparatus includes a collar portion having a first end and a second end, a flange disposed about the collar portion in a manner that divides the collar portion into an first side and a second side, and a retaining structure extending from a surface of the flange towards the second side of the collar portion. The retaining structure and the collar portion define therebetween an annular region for receipt of a sealing element, such as an o-ring or gasket. The retaining structure prevents the sealing element from extruding outwards and/or failing when under pressure.

17 Claims, 3 Drawing Sheets

DUCT COUPLING APPARATUS AND METHOD OF ITS USE

BACKGROUND

The instant disclosure relates to coupling devices. In particular, the instant disclosure relates to devices for coupling sections of flexible ducting to each other.

Flexible ducting can be used to supply cool air to parked aircraft. For example, lengths of flexible ducting are often used to supply cool air to the avionics compartment such that the sensitive equipment therein does not overheat. It is known to use coupling devices to interconnect lengths of flexible ducting running from the air conditioning unit to the aircraft.

As avionics technology advances, however, the amount of electronics in an aircraft, and thus the heat output, increases. In addition, these electronics are often installed in smaller and smaller spaces. As a result, there is a need to deliver increased cooling on modern aircraft.

Increased cooling capacity can be provided by delivering the conditioned air at a higher pressure, at a higher flow rate, or at both a higher pressure and a higher flow rate. Although the ducting itself can often sustain these higher pressures and/or flow rates, extant couplings often cannot. In particular, the seals (e.g., o-rings and/or gaskets) of extant couplings can fail under these higher pressures and/or flow rates.

Current solutions to such problems include the use of duct tape around the seals, zip ties around the seals, or the use of customized seals (e.g., solid o-rings instead of standard hollow o-rings). Each of these solutions has shortcomings. For example, both duct tape and zip ties eventually fail under the higher pressures and/or flow rates, with broken zip ties posing the additional hazard of foreign object damage to the aircraft. Similarly, the use of solid o-rings requires the use of vice grips or other tools in order to couple the ducting sections together. Yet, tools are often prohibited on flight lines.

BRIEF SUMMARY

It is therefore desirable to provide a coupling that is capable of withstanding the increased pressures and/or flow rates associated with the cooling of modern aircraft without requiring substantial reengineering or the use of tools to interconnect duct sections.

Disclosed herein is a duct coupling apparatus, including: a collar portion having a first end and a second end; a flange disposed about the collar portion at a position intermediate the first and second ends, wherein the flange divides the collar portion into an first side and a second side; and a retaining structure extending from a surface of the flange towards the second side of the collar portion, wherein the second side of the collar portion and the retaining structure define therebetween an annular region. The duct coupling apparatus can also include a sealing element, such as an o-ring or a gasket, disposed within the annular region. The retaining structure can extend from the surface of the flange a distance between ⅓ and ½ of a diameter of the sealing element.

In certain aspects, the duct coupling apparatus also includes a locking mechanism operable to releasably secure the duct coupling apparatus to a subsequent duct section. The locking mechanism can include a plurality of hooks extending from the surface of the flange as well as knobs operable to engage and disengage the hooks.

Suitable retaining structures include, without limitation, a rail extending around at least a portion of the perimeter of the flange and a wall extending around at least a portion of the perimeter of the flange. The retaining structure can be attached to the flange, for example by welding it to the surface of the flange, or can be integrally formed with the flange.

In another embodiment, a ducting system includes a flexible duct and a coupling comprising: a collar portion; a flange disposed about the collar portion and dividing the collar portion into a first side and a second side; and a retaining structure extending from a surface of the flange towards the second side of the collar portion, wherein the second side of the collar portion and the retaining structure define therebetween an annular region, wherein the flexible duct is releasably secured to the first side of the collar portion. The coupling can also include a locking mechanism operable to releasably secure the second side of the collar portion to a subsequent flexible duct. Typically, a sealing element will be disposed within the annular region.

Also disclosed herein is a method of manufacturing a duct coupling apparatus, including the following steps: forming a collar; forming a flange around the collar; and forming a retaining structure extending from a surface of the flange and around at least a portion of the perimeter of the flange, wherein the collar and the retaining structure define therebetween an annular region. The retaining structure can be formed, for example, by securing (e.g., by welding) a rail that extends around at least a portion of the perimeter of the flange to the surface of the flange.

The foregoing and other aspects, features, details, utilities, and advantages of the present invention will be apparent from reading the following description and claims, and from reviewing the accompanying drawings.

DETAILED DESCRIPTION

The present invention provides methods, apparatuses, and systems for the coupling of sections of ducting. For purposes of illustration, embodiments will be described herein in detail in connection with the flexible ducting utilized to deliver cool air to parked aircraft. It is contemplated, however, that the instant teachings may be practiced to good advantage in other contexts, and in particular where it is necessary or desirable to provide a coupling that can sustain high pressures and/or flow rates.

Figure 1:
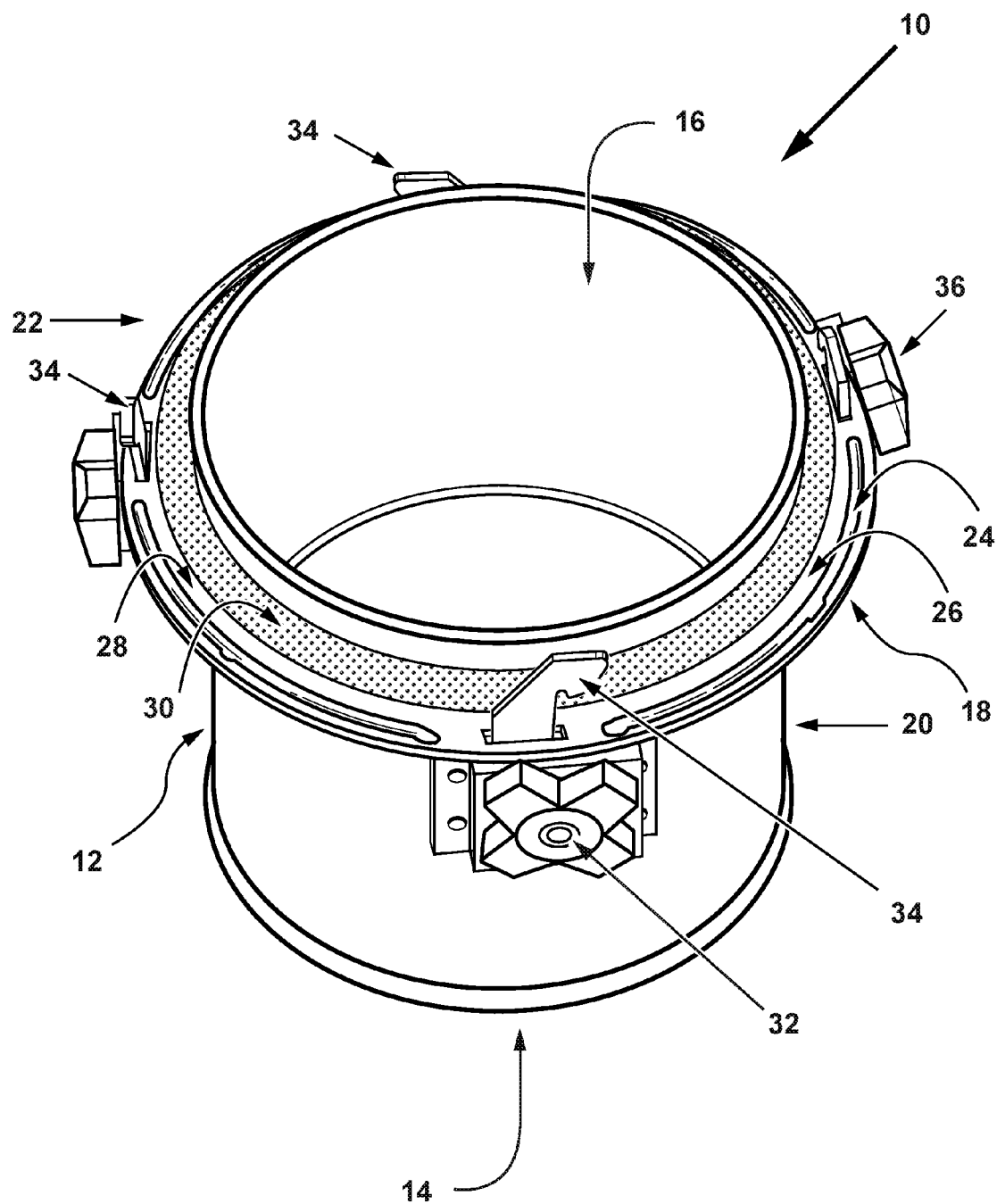
FIG. 1 depicts a duct coupling apparatus according to an embodiment disclosed herein.

FIG. 1 depicts a duct coupling apparatus 10 according to an embodiment disclosed herein. As shown in FIG. 1, duct coupling apparatus 10 includes a collar portion 12 having a first end 14 (e.g., an inlet) and a second end 16 (e.g., an outlet). A flange 18 is disposed about collar portion 12 at a point between first and second ends 14, 16, thereby dividing collar portion 12 into a first side 20 (e.g., an inlet side) and a second side 22 (e.g., an outlet side). Second side 22 forms a male fitting for attachment to a corresponding female fitting on an adjacent (e.g., downstream) duct section.

A retaining structure 24 extends from a surface 26 of flange 18. Typically, retaining structure 24 extends towards second side 22 of collar portion 12, but it is within the spirit and scope of the present teachings for retaining structure 24 to extend towards first side 20 instead or in addition. In either case, retaining structure 24 defines one boundary of an annular region 28, with second side 22 (and/or first side 20, as the case may be) defining the other boundary of annular region 28.

A sealing element 30, such as an o-ring or a gasket, is seated within annular region 28. Sealing element 30 can be seated against surface 26 of flange 18 (and, as described in further detail below, is so seated when duct coupling apparatus 10 is engaged with a mating coupling apparatus on an adjacent duct section). Sealing element 30 is retained within annular region 28 by retaining structure 24, which extends around at least a portion of the perimeter of flange 18. That is, retaining structure 24 prevents sealing element 30 from extruding outwards and leaking or otherwise failing when under pressure. In certain aspects, retaining structure 24 extends around the entire perimeter of flange 18 except at points where locking mechanisms (described below) are located.

Suitable retaining structures include rails (that is, structures that are attached to surface 26 of flange 18 at a series of discrete points), walls (that is, structures that are attached to surface 26 of flange 18 along a continuous line), and any other structures that can prevent the outward extrusion/ expansion of sealing element 30. Typically, the height of retaining structure 24 (that is, the distance that retaining structure 24 extends from surface 26 of flange 18) will be between about ⅓ and ½ of the diameter of sealing element 30. Retaining structure 24 can be integrally formed with flange 18 or formed separately and attached thereto, for example by welding.

Duct coupling apparatus 10 further includes a locking mechanism 32, such as a plurality of hooks 34 extending from surface 26 of flange 18 and a corresponding plurality of knobs 36 operable to engage and disengage hooks 34. As the ordinarily skilled artisan will appreciate, locking mechanism 32 is operable to releasably secure duct coupling apparatus 10 to a mating coupling apparatus on an adjacent duct section.

Figure 2:
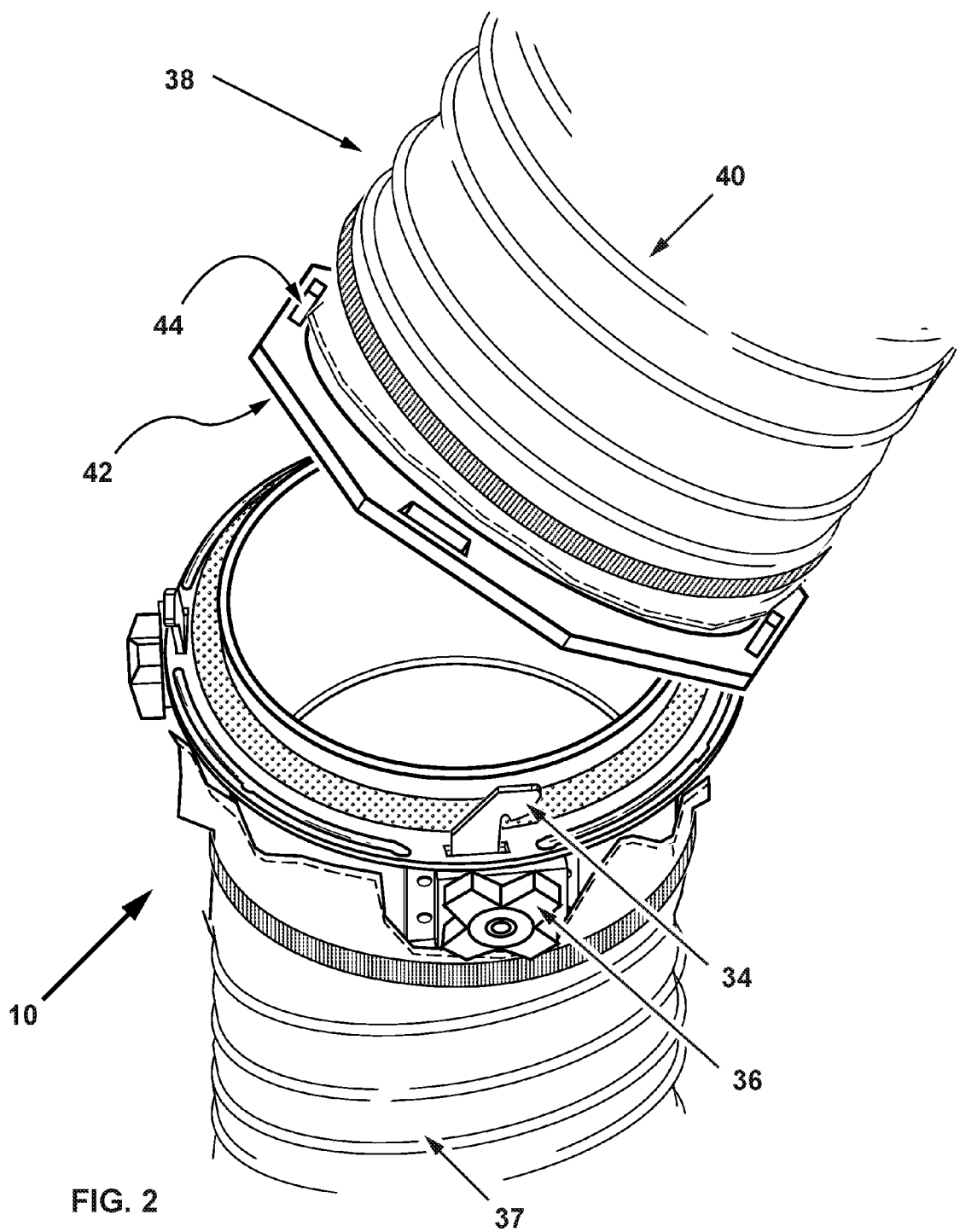
FIG. 2 illustrates the initial stages of interconnection between adjacent duct sections.
Figure 3:
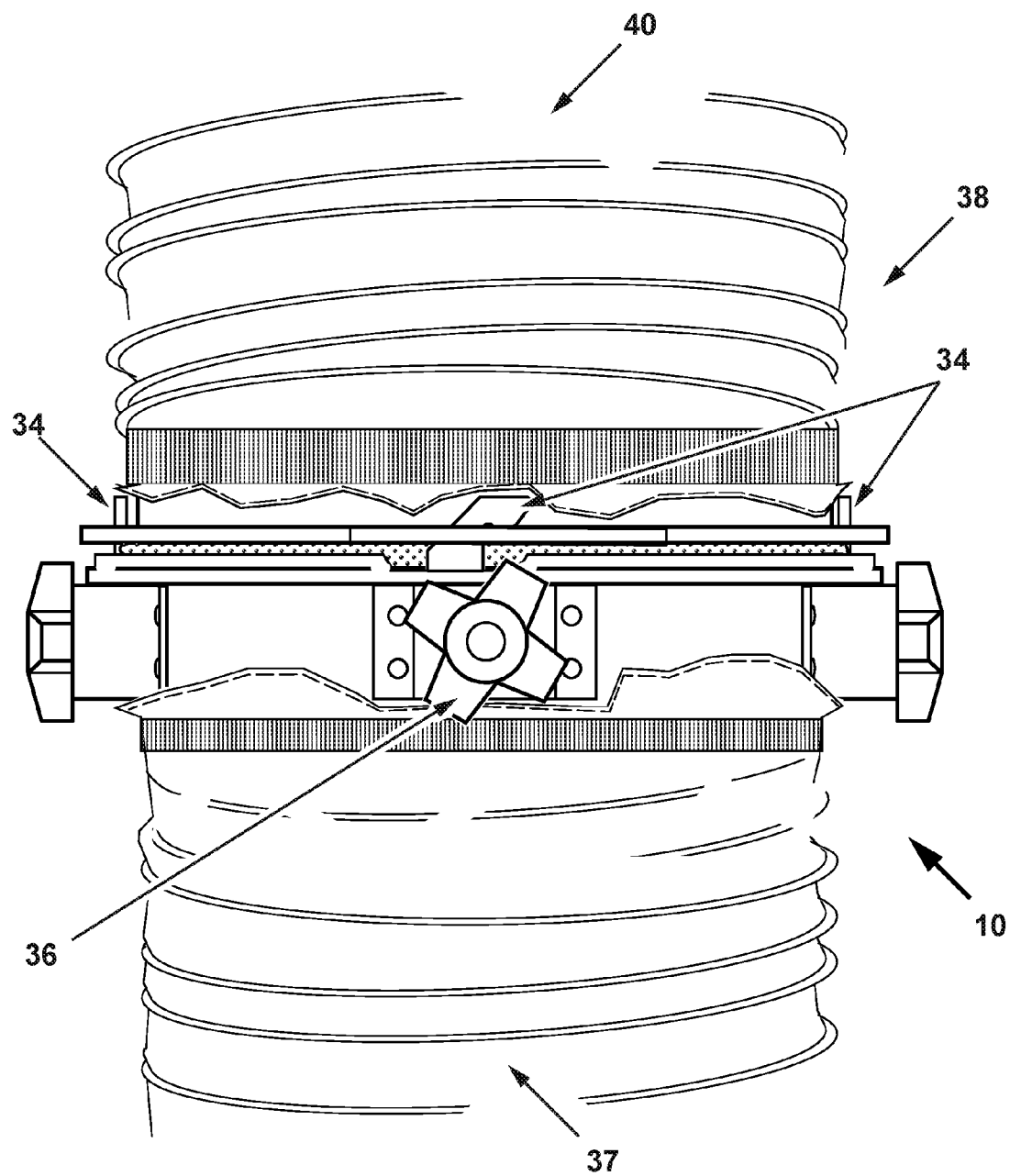
FIG. 3 illustrates adjacent duct sections after interconnection.

In use, as shown in FIGS. 2 and 3, a section of flexible duct 37 is attached to first side 20 of duct coupling apparatus 10, for example via the use of worm gear clamps. Second side 22 of duct coupling apparatus 10 is then mated with a female coupling apparatus 38 attached to the end of an adjacent duct section 40. Sealing element 30 is compressed between surface 26 of flange 18 on duct coupling apparatus 10 and corresponding flats 42 (or, in some embodiments, a corresponding flange) on female coupling apparatus 38, thereby forming a seal between flexible duct 37 and adjacent duct section 40. Knobs 36 are then turned, causing hooks 34 to engage corresponding slots 44 on flats 42 of female coupling apparatus 38.

Although several embodiments of this invention have been described above with a certain degree of particularity, those skilled in the art could make numerous alterations to the disclosed embodiments without departing from the spirit or scope of this invention.

For example, the invention has been described above with reference to the inclusion of a retaining structure on a male coupling apparatus (e.g., 10). It is contemplated, however, that the retaining structure could instead be provided on the mating female coupling apparatus (e.g., 38).

As another example, surface 26 could include a dimple, recess, or other depression into which sealing element 30 fits, as an additional or alternative structure to prevent the outward extrusion and/or failure thereof. Of course, just as the retaining structure can be provided on the mating female coupling apparatus (e.g., 38), so too could the mating female coupling apparatus (e.g., 38) include a dimple, recess, or other depression.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A duct coupling apparatus, comprising:
   a collar portion having a first end and a second end;
   a flange disposed about the collar portion at a position intermediate the first and second ends, wherein the flange divides the collar portion into a first side and a second side;
   a retaining structure extending from a surface of the flange towards the second side of the collar portion, wherein the second side of the collar portion and the retaining structure define therebetween an annular region; and
   a locking mechanism, separate from the retaining structure and operable to releasably secure the duct coupling apparatus to a subsequent duct section,
   wherein the retaining structure extends around less than an entire perimeter of the flange.

2. The duct coupling apparatus according to claim 1, further comprising a sealing element disposed within the annular region.

3. The duct coupling apparatus according to claim 2, wherein the retaining structure extends from the surface of the flange a distance between ⅓ and ½ of a diameter of the sealing element.

4. The duct coupling apparatus according to claim 2, wherein the sealing element comprises an o-ring.

5. The duct coupling apparatus according to claim 2, wherein the sealing element comprises a gasket.

6. The duct coupling apparatus according to claim 5, wherein the locking mechanism comprises a plurality of hooks extending from the surface of the flange.

7. The duct coupling apparatus according to claim 1, wherein the retaining structure comprises a rail extending around at least a portion of the perimeter of the flange and less than the entire perimeter of the flange.

8. The duct coupling apparatus according to claim 1, wherein the retaining structure comprises a wall extending around at least a portion of the perimeter of the flange and less than the entire perimeter of the flange.

9. The duct coupling apparatus according to claim 1, wherein the retaining structure is welded to the surface of the flange.

10. The duct coupling apparatus according to claim 1, wherein the retaining structure is integrally formed with the flange.

11. The duct coupling apparatus according to claim 1, wherein the retaining structure comprises a plurality of retaining segments separated by inter-segment spaces.

12. The duct coupling apparatus according to claim 1, wherein the retaining structure is secured to the surface of the flange.

13. A ducting system, comprising:
   a flexible duct; and
   a coupling comprising:
      a collar portion;
      a flange disposed about the collar portion and dividing the collar portion into a first side and a second side;
      a retaining structure extending from a surface of the flange towards the second side of the collar portion, wherein the second side of the collar portion and the retaining structure define therebetween an annular region; and
      a locking mechanism, separate from the retaining structure and operable to releasably secure the second side of the collar portion to a subsequent flexible duct,
      wherein the retaining structure extends around less than an entire perimeter of the flange, and
   wherein the flexible duct is releasably secured to the first side of the collar portion.

14. The ducting system according to claim 13, further comprising a sealing element disposed within the annular region.

15. The ducting system according to claim 13, wherein the retaining structure comprises a rail extending around at least a portion of the perimeter of the flange and less than the entire perimeter of the flange.

16. The ducting system according to claim 13, wherein the retaining structure comprises a wall extending around at least a portion of the perimeter of the flange and less than the entire perimeter of the flange.

17. The ducting system according to claim 13, wherein the retaining structure is secured to the surface of the flange.

* * * * *